United States Patent
Smith et al.

(10) Patent No.: US 10,082,168 B2
(45) Date of Patent: Sep. 25, 2018

(54) METHOD FOR REDUCING SPATIAL GAPS IN SNAP LOCKING FEATURES

(71) Applicant: DELPHI TECHNOLOGIES, INC., Troy, MI (US)

(72) Inventors: Mark Wayne Smith, El Paso, TX (US); Steven P. Ragalyi, Cortland, OH (US); Grant Michael Wheeler, El Paso, TX (US); Jesus R. Morales, Chihuahua (MX)

(73) Assignee: DELPHI TECHNOLOGIES, INC., Troy, MI (US)

( * ) Notice: Subject to any disclaimer, the term of this patent is extended or adjusted under 35 U.S.C. 154(b) by 483 days.

(21) Appl. No.: 14/972,738

(22) Filed: Dec. 17, 2015

(65) Prior Publication Data

US 2017/0175790 A1    Jun. 22, 2017

(51) Int. Cl.
 *F16B 17/00*  (2006.01)
 *F16B 5/06*   (2006.01)

(52) U.S. Cl.
 CPC .......... *F16B 17/002* (2013.01); *F16B 5/0664* (2013.01); *Y10T 403/581* (2015.01)

(58) Field of Classification Search
 CPC .............. B60R 16/023; B60R 16/0238; B60R 16/0239; Y10T 403/49; Y10T 403/4933; Y10T 403/4941; Y10T 403/4949; Y10T 403/4958; Y10T 403/4966; Y10T 403/4974; Y10T 403/58; Y10T 403/581; Y10T 403/583; Y10T 403/585; Y10T 403/587; F16B 2/20; F16B 2/22; F16B 5/0016; F16B 5/0064; F16B 5/07; F16B 17/002; F16B 17/004; F16B 17/006; F16B 17/008; B29C 65/08; B29C 65/081; B29C 65/083; B29C 65/088
 See application file for complete search history.

(56) References Cited

U.S. PATENT DOCUMENTS

| | | | | |
|---|---|---|---|---|
| 4,367,979 A * | 1/1983 | Milligan | ................. | E02B 15/08 405/70 |
| 5,042,269 A * | 8/1991 | Sullivan | .................. | F04D 25/16 285/319 |
| 5,180,250 A * | 1/1993 | Ferro | .................... | E05D 5/0238 403/252 |
| 5,678,953 A * | 10/1997 | Usui | ..................... | F16B 21/088 359/819 |
| 5,782,441 A * | 7/1998 | Shimizu | ............... | H02G 3/0608 248/58 |

(Continued)

FOREIGN PATENT DOCUMENTS

DE       102013009847 A1 * 12/2013     ............. B60N 2/682

*Primary Examiner* — Jonathan P Masinick
(74) *Attorney, Agent, or Firm* — Robert J. Myers (57) ABSTRACT

A method of closing a spatial gap between a first mating surface of a first snap locking feature defined by a first part and a second mating surface of a second snap locking feature defined by a second part. This method includes the steps of attaching the first and second parts to one another by sliding the first and second snap locking features over one another until the first mating surface is proximate the second mating surface and deforming a portion of the first part to fabricate a protrusion that contacts the second part and urges the second part in a direction effective to place the first and second mating surfaces into direct contact with one another.

20 Claims, 7 Drawing Sheets

(56) References Cited

U.S. PATENT DOCUMENTS

| | | | | |
|---|---|---|---|---|
| 7,634,884 B2* | 12/2009 | Pervan | ................... | E04F 15/02 |
| | | | | 428/50 |
| 7,878,822 B2* | 2/2011 | Korczynski | ......... | B60R 16/0238 |
| | | | | 220/326 |
| 8,573,987 B1* | 11/2013 | Schweitzer | ............ | H01R 9/226 |
| | | | | 439/457 |

* cited by examiner

METHOD FOR REDUCING SPATIAL GAPS IN SNAP LOCKING FEATURES

TECHNICAL FIELD OF THE INVENTION

The invention generally relates to snap locking features, particularly a method for reducing spatial gaps between mating surfaces in snap locking features.

BACKGROUND OF THE INVENTION

Snap locks, such as those used to secure components in electrical connection systems, have at least one locking feature that is disposed on a resilient member. As the feature disposed on a resilient member slides past the other locking feature, the resilient member flexes. Once mating surfaces of the locking features slide clear of one another, the resilient member snaps back to its original shape and the mating surfaces are engaged. However, to allow the mating surfaces to slide clear of one another requires an "over travel distance" in the assembly of the locking features to accommodate flexing of the resilient member. Depending on the configuration, this "over travel distance" can typically range between 0.75 and 1.25 millimeters (mm). Once assembled, this over travel forms a gap between the mating surfaces that allows relative motion between the connector components when subjected to vibration & thermal cycling. This motion between the connector components can cause a "force multiplication factor" that has been observed in laboratory vibration testing that subjects the connector components to forces two to three greater than expected. This results in decreased product life and increased warranty replacement costs. Therefore a method for reducing or eliminating the gap between mating surfaces caused by over travel in a snap connector is desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, a method of closing a spatial gap between a first mating surface of a first snap locking feature defined by a first part and a second mating surface of a second snap locking feature defined by a second part is provided. This method includes the steps of attaching the first and second parts to one another by sliding the first and second snap locking features over one another until the first mating surface is proximate the second mating surface and deforming a portion of the first part to fabricate a protrusion that contacts the second part and urges the second part in a direction effective to place the first and second mating surfaces into direct contact with one another.

The protrusion may be characterized as having a generally cylindrical shape. The protrusion may be formed by applying ultrasonic vibrational energy to the first part using a generally cylindrical probe, preferably with a flat contact face. As used herein and throughout, generally cylindrical means a prism having a circular, elliptical, oval, or ovoid cross section.

The first and second parts may be electrical connection components. In particular, the first part may be a main housing of an electrical center that is configured to be disposed within a motor vehicle and the second part may be a component housing of the electrical center.

The second snap locking feature may be defined by a resilient member and the resilient member may be characterized as a resilient cantilever beam.'

The first snap locking feature may define a third mating surface that is generally parallel to the first mating surface and the second snap locking feature may define a fourth mating surface that is generally parallel to the second mating surface. As used herein and throughout, generally parallel means±15 degrees of absolutely parallel. The deformed portion of the first part may be a portion of the first snap locking feature that urges the second part in a direction effective to place the first and second mating surfaces into direct contact with one another. In this case, the first snap locking feature is defined by a resilient member. The resilient member may be characterized as a resilient cantilever beam or a resilient fixed beam.

In accordance with another embodiment, an assembly formed by joining a first part to a second part having a minimized spatial gap between a first mating surface of a first snap locking feature defined by the first part and a second mating surface of a second snap locking feature defined by the second part is provided. This assembly is formed by the method described above.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

The problem of the gap caused by "over travel" in a snap lock connection is solved by using a modified sonic welding process to form a protrusion to eliminate this "over travel" gap after the snap locking features are assembled forming a semi-rigid assembly. One side of component joined by the snap locking features is deformed to form the protrusion to push against the other mating component. A metal pin applies ultrasonic energy to heat the plastic material forming the component and pushes against the softened plastic material to form a dimple and a corresponding protrusion in the material to a distance so that the protrusion touches and moves the mating component, thus eliminating the "over travel" gap.

FIGS. 1A-1D illustrate a non-limiting example of an assembly 110 having various parts that are held together by snap locking features 120. The illustrated assembly is an electrical center 110 that is used to interconnect electrical devices, such as relays and fuses (not shown), with wiring harnesses (not shown) in a motor vehicle (not shown). The electrical center 110 includes a main housing 112 that holds components or modular sub-assemblies, such as fuse modules or relay module housings 114. The main housing 112 is formed of a thermoplastic material, e.g. acrylonitrile butadiene styrene (ABS), polypropylene (PP), or an acrylic multipolymer. The module housings 114 allow the electrical center 110 to be customized for a wide variety of applications by using different combinations of fuse and relay modules. These module housings 114 are secured to the main housing 112 by the snap locking features 120. As discussed in the BACKGROUND OF THE INVENTION, these snap locking features 120 leave spatial gaps between the snap locking feature mating surfaces due to over travel of the snap locking features (not shown). The main housing 112 and the module housing 114 may include guide rails and guide slots (not shown) to assist alignment of the housings during assembly.

In order to reduce or eliminate a spatial gap between the snap locking features 120 and mating surfaces, a dimple 116 formed in the main housing 112 by a probe 138 (see FIG. 1D) creating a corresponding protrusion (not shown) that contacts the module housing 114 and forces the mating surface of the snap locking feature defined by the module housing 114 into contact with the mating surface of the snap locking feature defined by the main housing 112.

Similar elements of the various embodiments share the same last two digits of the reference numbers. The reference numbers identifying the elements of the first embodiment are in the 200 range. The reference numbers identifying the elements of the second embodiment are in the 300 range. The reference numbers identifying the elements of the third embodiment are in the 400 range. The reference numbers identifying the elements of the fourth embodiment are in the 500 range.

FIGS. 2A-2E illustrate a non-limiting example of a first embodiment of the snap locking features. A substantially rigid inner wall 218 of the main housing 212 defines a first snap locking feature 220 having a first engagement ramp 222 that forms an acute angle with the inner wall 218 and a first mating surface 224 that is generally perpendicular to the inner wall 218. As used herein and throughout, generally perpendicular means±15 degrees of absolutely perpendicular. The module housing 214, also formed of a thermoplastic material, includes a resilient cantilever beam 226 attached to the module housing 214. The cantilever beam 226 has a second snap locking feature 228 with a second engagement ramp 230 forming an acute angle with the cantilever beam 226 and a second mating surface 232 that is generally perpendicular to the cantilever beam 226 and generally parallel to the first mating surface 224.

Figure 1A:
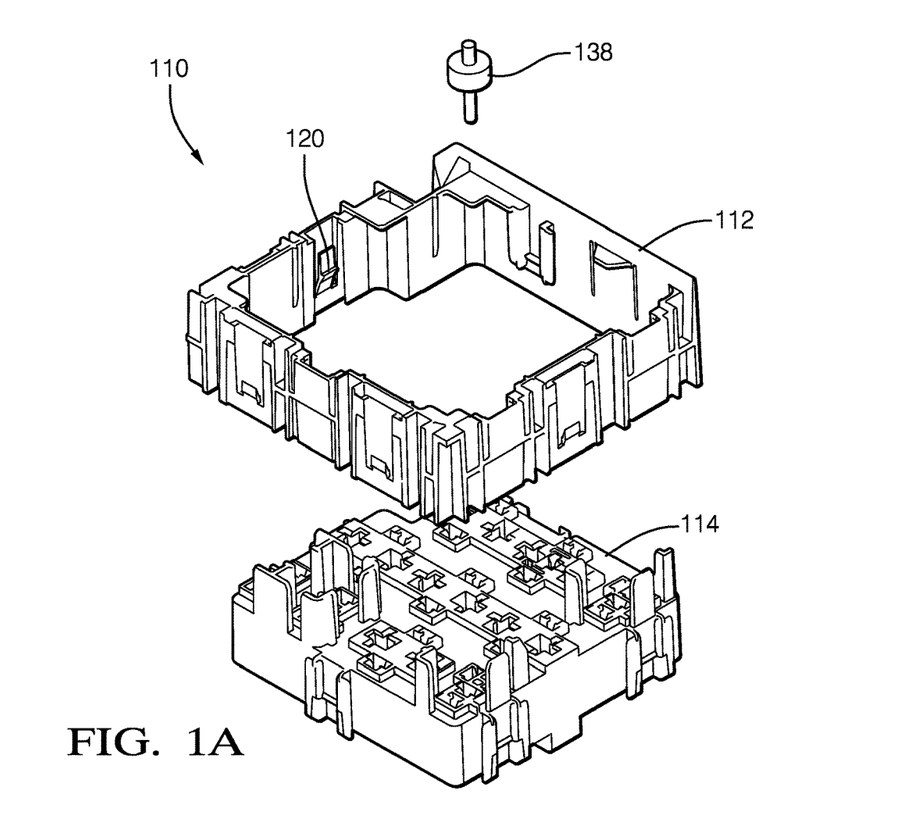
FIGS. 1A-1D are perspective views of an assembly process for an electrical center configured to be disposed within a motor vehicle having a snap locking feature.
Figure 1B:
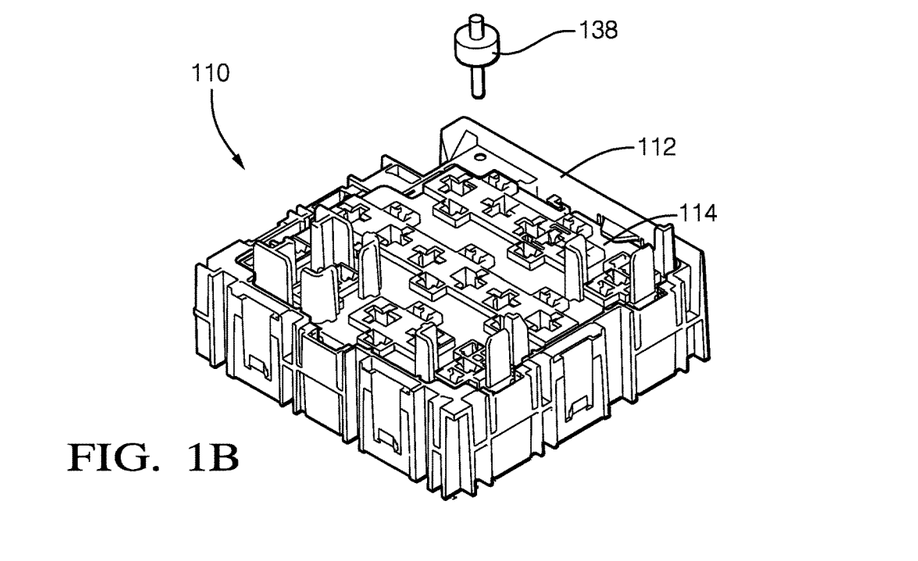
Figure 1C:
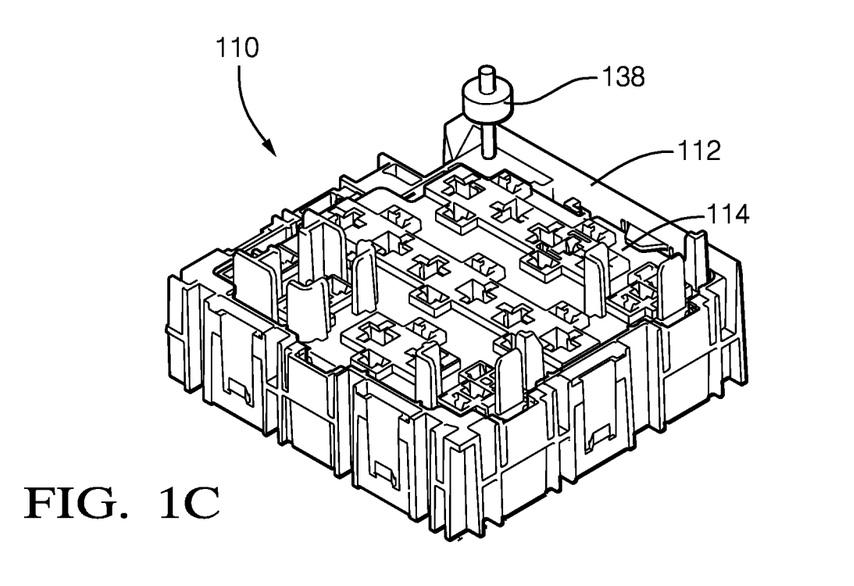
Figure 1D:
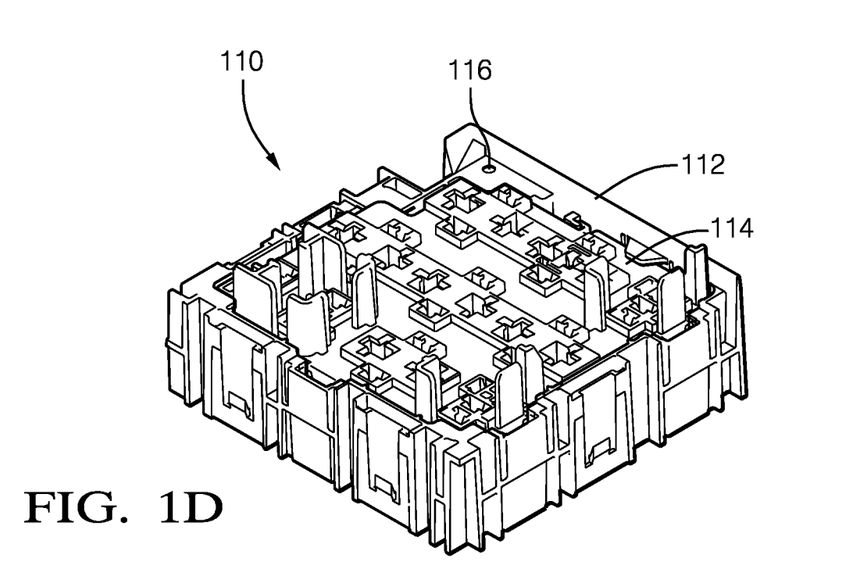
Figure 2A:
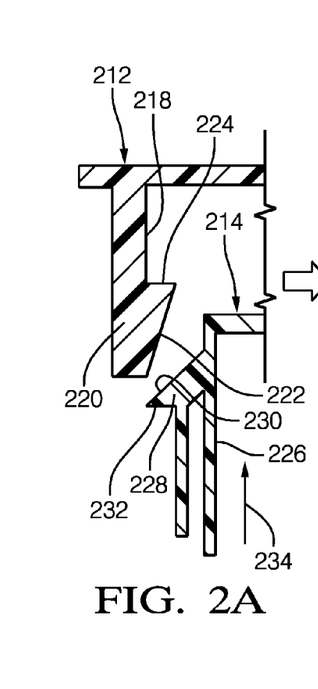
FIG. 2A is cross section side view of a snap locking feature in an unconnected state according to a first embodiment of the snap locking feature.
Figure 2B:
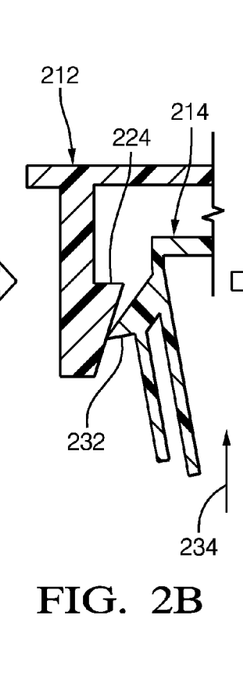
FIG. 2B is cross section side view of the snap locking feature of FIG. 2A in a pre-connected state according to the first embodiment of the snap locking feature.
Figure 2C:
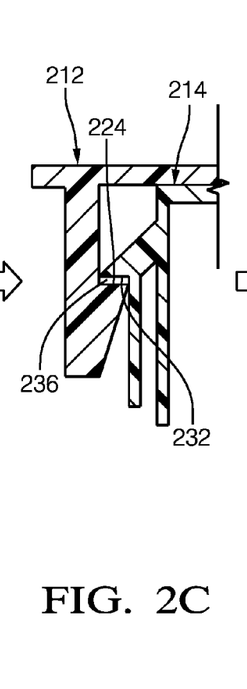
FIG. 2C is cross section side view of the snap locking feature of FIG. 2A in a connected state with a spatial gap between the first snap locking feature in relation to a second snap locking feature caused by over travel of the second snap locking feature according to the first embodiment of the snap locking feature.

As shown in FIG. 2A, the module housing 214 is inserted into the main housing 212 in an insertion direction 234. As shown in FIG. 2B, the cantilever beam 226 is deflected as the second engagement ramp 230 contacts the first engagement ramp 222 while the module housing 214 continues to be moved in the insertion direction 234. The angled first and second engagement ramps 222, 230 reduce the peak insertion force needed to deflect the cantilever beam 226. Once the second mating surface 232 has moved past the first mating surface 224, the cantilever beam 226 is no longer deflected and returns to its original position as shown in FIG. 2C. As shown in FIG. 2C, the first and second mating surfaces 224, 232 are engaged and will inhibit removal of the module housing 214 from the main housing 212. However, due to the over travel needed to move the second mating surface 232 past the first mating surface 224, there is a spatial gap 236 formed between the first and second mating surfaces 224, 232 as shown in FIG. 2C. This spatial gap allows relative moment between the main housing 212 and the module housing 214 even when the first and second mating surfaces 224, 232 are engaged.

Figure 2D:
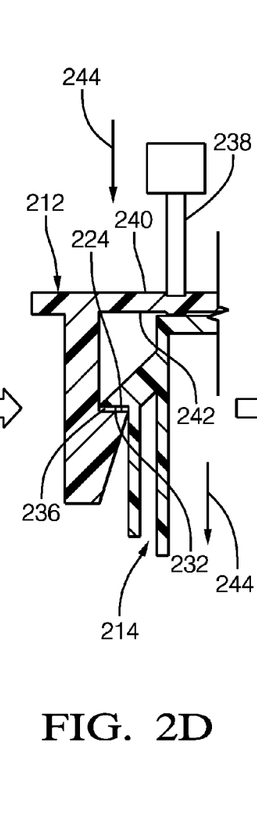
FIG. 2D is cross section side view of the snap locking feature of FIG. 2A in a connected state with a protrusion being formed to narrow the spatial gap according to the first embodiment of the snap locking feature.
Figure 2E:
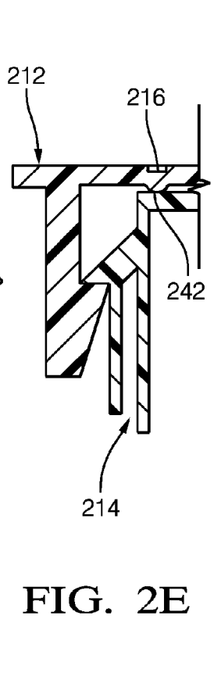
FIG. 2E is cross section side view of the snap locking feature of FIG. 2A in a connected state with the protrusion formed to eliminate the spatial gap according to the first embodiment of the snap locking feature.

In order to reduce or eliminate the spatial gap 236 between the first and second mating surfaces 224, 232 of the snap locking features 220, 228, a probe 238 of an ultrasonic welding machine (not shown), such as a Branson Series 2000X ultrasonic welding machine available through Emerson Industrial Automation of Saint Louis, Mo., is brought into contact with an outer surface 240 of the main housing 212 opposite an inner surface 242 of the main housing 212 proximate the module housing 214 as shown in FIG. 2D. The probe 238 has a generally cylindrical shape. The probe 238 is then vibrated at an ultrasonic frequency in a range between about 20 and 40 kilohertz (kHz) causing localized heating and softening of the thermoplastic material of the main housing 212. During or after the application of the ultrasonic vibration to the outer surface 240 of the main housing 212, the probe 238 is pushed into the outer surface 240 in a direction 244 opposite the insertion direction 234, thus forming a dimple 216 in the outer surface 240 and a corresponding bump or protrusion 242 from the inner surface 242. The cylindrical shape of the probe 238 produces an generally cylindrical protrusion 242. As it is formed, the protrusion 242 contacts the module housing 214 and forces the module housing 214 in the direction 244 opposite the insertion direction 234 until the first and second mating surfaces 224, 232 of the first and second snap locking features 220, 228 are in direct and intimate contact as shown in FIG. 2E.

The inventors have discovered that some alternative methods of forming the protrusion, such as cold forming using only pressure applied to a probe or hot forming using a heated probe, were insufficient to form a protrusion that would bring the mating surfaces of the snap locking features into contact with one another.

Figure 3A:
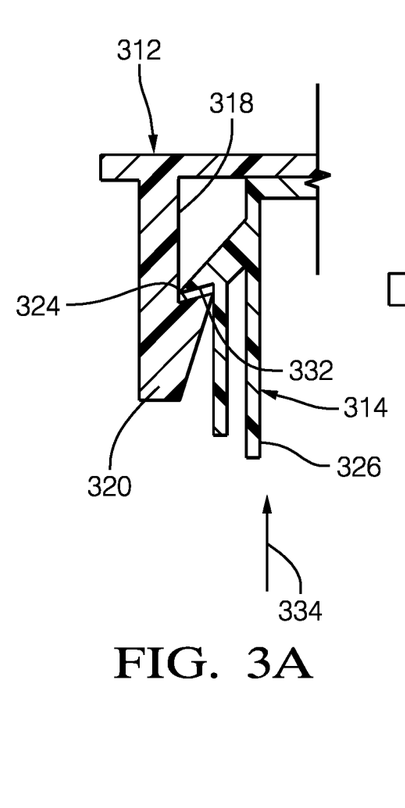
FIG. 3A is cross section side view of a snap locking feature in a connected state with a spatial gap between a first snap locking feature in relation to a second snap locking feature caused by over travel of the second snap locking feature according to a second embodiment of the snap locking feature.
Figure 3B:
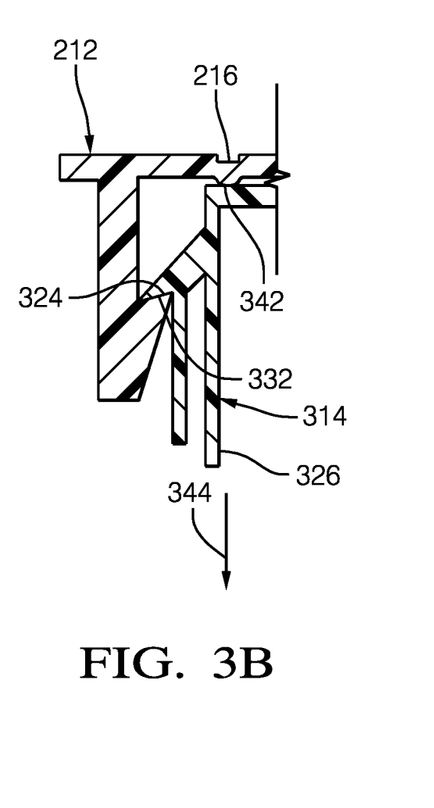
FIG. 3B is cross section side view of the snap locking feature of FIG. 3A in a connected state with the protrusion formed to eliminate the spatial gap according to the second embodiment of the snap locking feature.

A second embodiment of the snap locking features is shown in FIGS. 3A and 3B. This embodiment is very similar to the first embodiment, the major difference being that the first and second mating surfaces 324, 332 are not perpendicular to the inner wall 318 of the main housing 312 and the cantilever beam 326 respectively, but rather are undercut with the engagement ramps as shown in FIG. 3A. The second embodiment provides better protection against inadvertent disengagement of the first and second snap locking features 320, 328, but requires greater over travel to engage the first and second snap locking features 320, 328 compared with the first embodiment. As the protrusion 342 is formed, it contacts the module housing 314 and forces the module housing 314 in the direction 344 opposite the insertion direction 334 until the first and second mating surfaces 324, 332 of the first and second snap locking features 320, 328 are in direct and intimate contact as shown in FIG. 3B.

A third embodiment of the first and second snap locking features 420, 428 are shown in FIGS. 4A-4E. This third embodiment is again similar to the first embodiment. The third embodiment differs from the first embodiment in that the first snap locking feature 420 does not have an engagement ramp but rather includes a third mating surface 446 that is generally perpendicular to the inner wall 418 of the main housing 412 and is generally parallel to the first mating surface 424, thus forming a generally rectangular projection from the inner wall 418. The third embodiment further differs from the first embodiment in that the second snap locking feature 428 includes a fourth mating surface 448 that is generally perpendicular to the cantilever beam 426 and is generally parallel to the second mating surface 432, thus forming a generally rectangular indentation in the cantilever beam 426. As used herein and throughout, generally rectangular projection and generally rectangular indentation means having a rectangular, square, trapezoidal, or rhomboid cross section.

Figure 4A:
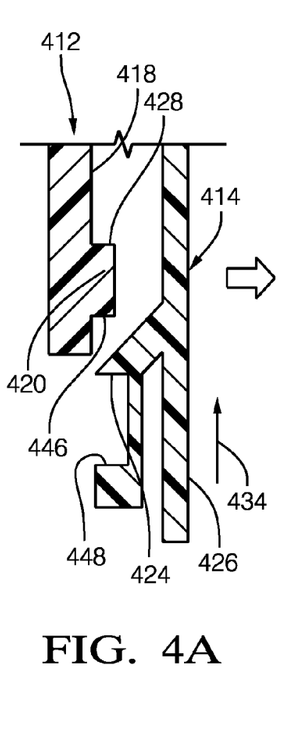
FIG. 4A is cross section side view of a snap locking feature in an unconnected state according to a third embodiment of the snap locking feature.
Figure 4B:
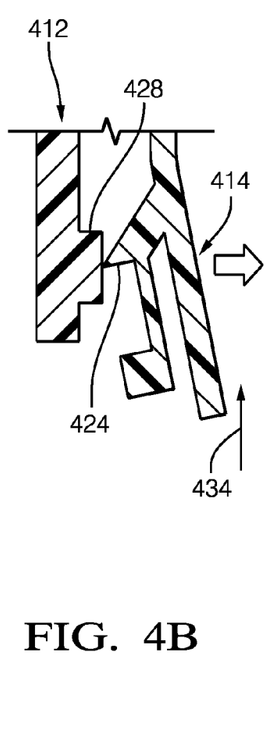
FIG. 4B is cross section side view of the snap locking feature of FIG. 4A in a pre-connected state according to the third embodiment of the snap locking feature.
Figure 4C:
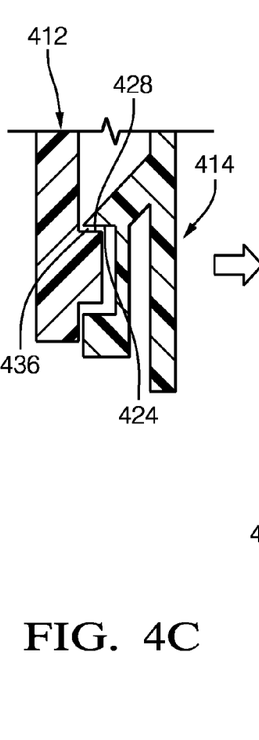
FIG. 4C is cross section side view of the snap locking feature of FIG. 4A in a connected state with a spatial gap between a first snap locking feature in relation to a second snap locking feature caused by over travel of the first snap locking feature according to the third embodiment of the snap locking feature.

As shown in FIG. 4A, the module housing 414 is inserted into the main housing 412 in an insertion direction 434. As shown in FIG. 4B, the cantilever beam 426 is deflected as the second engagement ramp 430 contacts the third mating surface 446 while the module housing 414 continues to be moved in the insertion direction 434. Once the second mating surface 432 has moved past the first mating surface 424, the cantilever beam 426 is no longer deflected and returns to its original position as shown in FIG. 4C. The first and second mating surfaces 424, 432 are engaged and will inhibit removal of the module housing 414 from the main housing 412. However, due to the over travel needed to move the second mating surface 432 past the first mating surface 424, there is a spatial gap 436 formed between the first and second mating surfaces 424, 432 as shown in FIG. 4C.

Figure 4D:
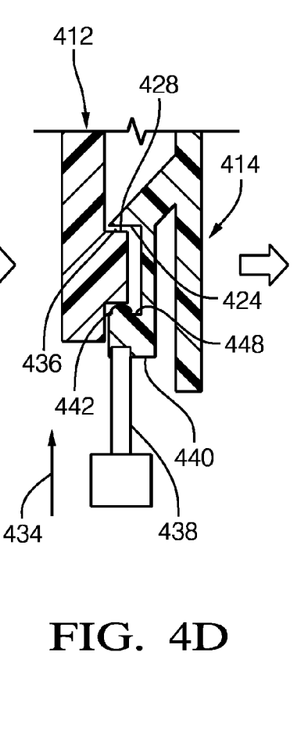
FIG. 4D is cross section side view of the snap locking feature of FIG. 4A in a connected state with a protrusion being formed in the first snap locking feature to narrow the spatial gap according to the third embodiment of the snap locking feature.
Figure 4E:
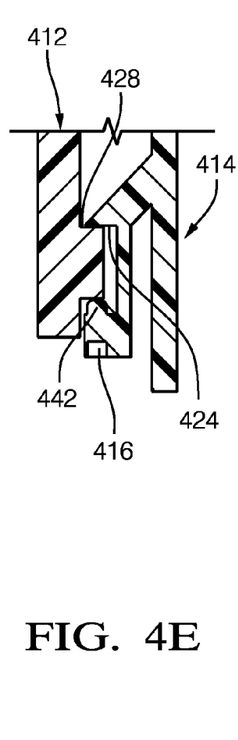
FIG. 4E is cross section side view of the snap locking feature of FIG. 4A in a connected state with the protrusion formed in the first snap locking feature to eliminate the spatial gap according to the third embodiment of the snap locking feature.

In order to reduce or eliminate the spatial gap 436 between the first and second mating surfaces 424, 432 of the first and second snap locking features 420, 428, the probe 438 of the ultrasonic welding machine is brought into contact with an outer surface 440 of the second snap locking feature 428 opposite the third mating surface 446 as shown in FIG. 4D. The probe 438 is then vibrated at an ultrasonic frequency in a range between about 20 and 40 kHz, preferably about 20 kHz causing localized heating and softening of the material of the second snap locking feature 428. During or after the application of the ultrasonic vibration to the main housing 412, the probe 438 is pushed into the outer surface 440 in the insertion direction 434, thus forming a dimple 416 in the outer surface 440 and a corresponding bump or protrusion 442 from the fourth mating surface 448. As it is formed, the protrusion 442 contacts the third mating surface 446 and forces the module housing 414 in the insertion direction 434 until the first and second mating surfaces 424, 432 of the first and second snap locking features 420, 428 are in direct and intimate contact as shown in FIG. 4E.

Figure 5A:
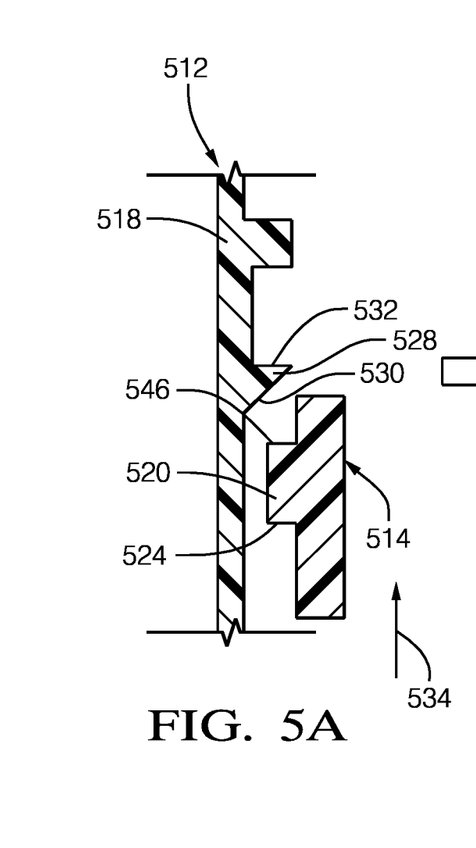
FIG. 5A is cross section side view of a snap locking feature in an unconnected state according to a fourth embodiment of the snap locking feature.
Figure 5B:
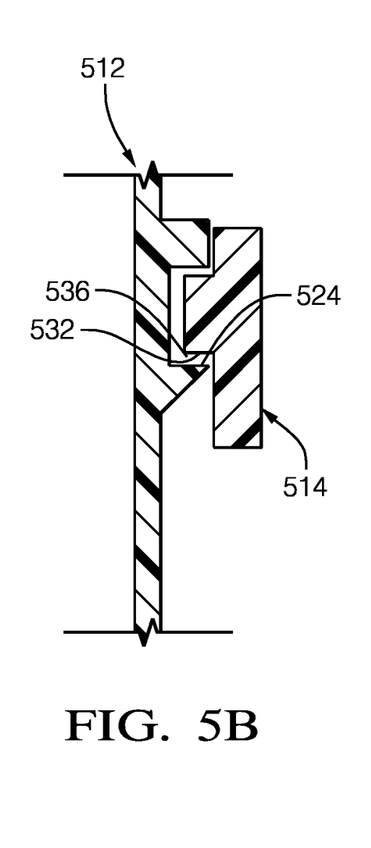
FIG. 5B is cross section side view of a snap locking feature in a connected state with a spatial gap between a first snap locking feature in relation to a second snap locking feature caused by over travel of the first snap locking feature according to the fourth embodiment of the snap locking feature.
Figure 5C:
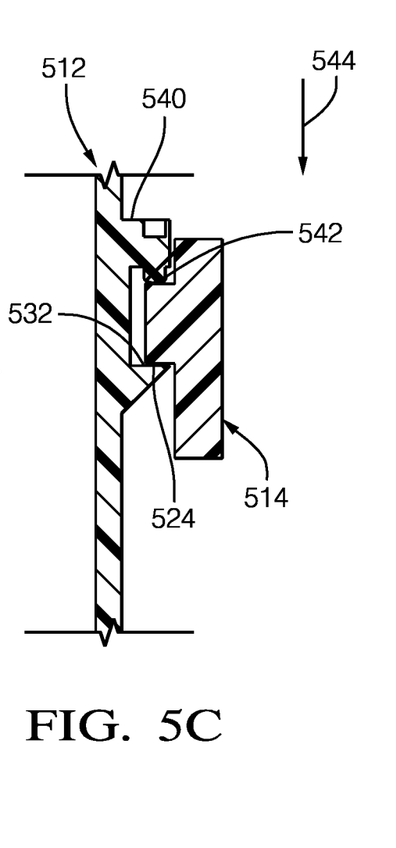
FIG. 5C is cross section side view of the snap locking feature of FIG. 3A in a connected state with the protrusion formed to eliminate the spatial gap according to the fourth embodiment of the snap locking feature.

A fourth embodiment of the snap locking features is shown in FIGS. 5A-5C. This fourth embodiment is most similar to the third embodiment. However, according to the fourth embodiment, the first snap locking feature 520 is defined by the module housing 514 and the second snap locking feature 528 is defined by the inner wall 518 of the main housing 512. The inner wall 518 of the main housing 512 is resilient rather than rigid and may be characterized as a resilient cantilever beam or a resilient fixed beam.

As shown in FIG. 5A, the module housing 514 is inserted into the main housing 512 in an insertion direction 534. As the module housing 514 is inserted, the inner wall 518 is deflected outwardly as the second engagement ramp 530 contacts the third mating surface 546. Once the second mating surface 532 has moved past the first mating surface 524, the inner wall 518 is no longer deflected and returns to its original position as shown in FIG. 5B. The first and second mating surfaces 524, 532 are engaged and will inhibit removal of the module housing 514 from the main housing 512. However, due to the over travel needed to move the second mating surface 532 past the first mating surface 524, there is a spatial gap 536 formed between the first and second mating surfaces 524, 532 as shown in FIG. 5B.

To close the spatial gap 536 between the first and second mating surfaces 524, 532 of the first and second snap locking features 520, 528, the probe (not shown) of the ultrasonic welding machine is brought into contact with an outer surface 540 of the second snap locking feature 528 opposite the third mating surface 546. As it is formed, the protrusion 542 contacts the third mating surface 546 and forces the module housing 514 in the direction 544 opposite the insertion direction 534 until the first and second mating surfaces 524, 532 of the first and second snap locking features 520, 528 are in direct and intimate contact as shown in FIG. 5C.

Figure 6:
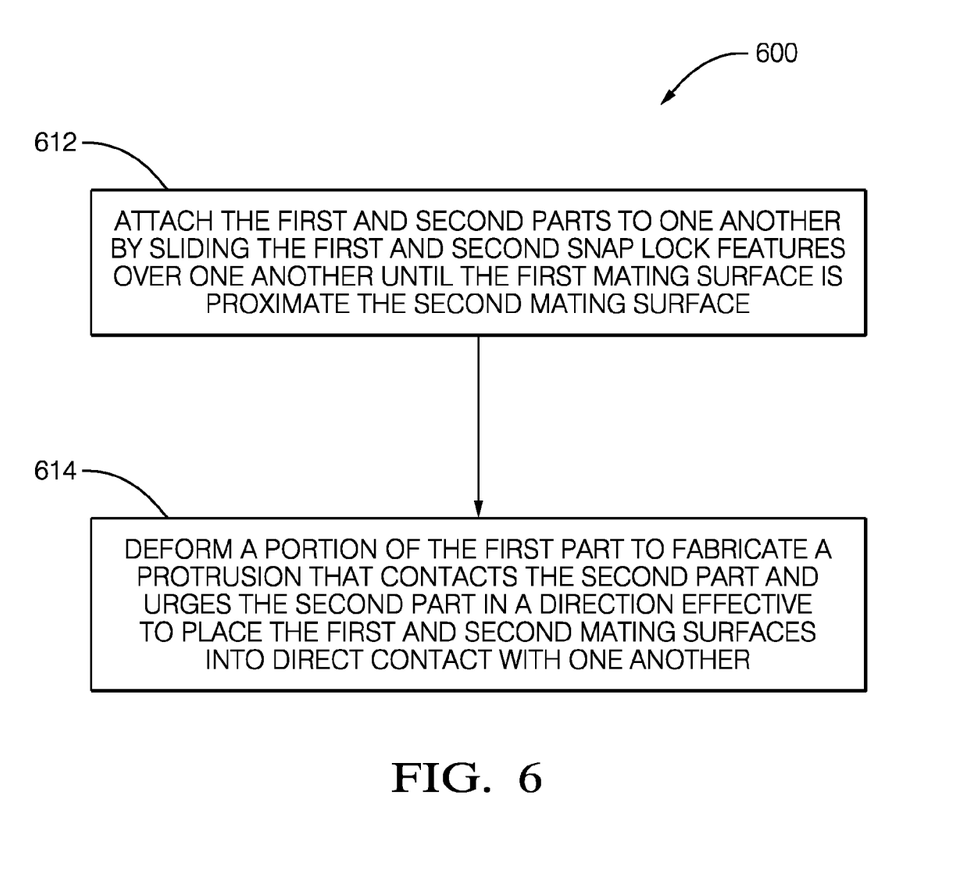
FIG. 6 is a flowchart of method of closing a spatial gap between a first mating surface of a first snap locking feature defined by a first part and a second mating surface of a second snap locking feature defined by a second part according to any of the embodiments.

FIG. 6 illustrates a non-limiting example of a method 600 of closing a spatial gap 236 between a first mating surface 224 of a first snap locking feature 220 defined by a first part, such as a main housing 212, and a second mating surface 232 of a second snap locking feature 228 defined by a second part, such as a module housing 214. The method 600 includes the following steps:

STEP 612, ATTACH THE FIRST AND SECOND PARTS TO ONE ANOTHER BY SLIDING THE FIRST AND SECOND SNAP LOCKING FEATURES OVER ONE ANOTHER UNTIL THE FIRST MATING SURFACE IS PROXIMATE THE SECOND MATING SURFACE, includes attaching the first and second parts to one another by sliding the first and second snap locking features 220, 228 over one another until the first mating surface 224 is proximate the second mating surface 232.

The first and second parts are electrical connection components. The first part is a main housing 112 of an electrical center 110 configured to be disposed within a motor vehicle and the second part is a component module housing 114 of the electrical center 110. The second snap locking feature 228 may be defined by a resilient member and the resilient member is characterized as a resilient cantilever beam 226 as shown in FIGS. 2A-2E.

The first snap locking feature 420 may define a third mating surface 446 generally parallel to the first mating surface 424 and the second snap locking feature 428 defines a fourth mating surface 448 generally parallel to the second mating surface 432 as shown in FIGS. 4A-4E. The deformed portion of the first part may be a portion of the first snap locking feature 420 that urges the second part in a direction effective to place the first and second mating surfaces 424, 432 into direct contact with one another. In this case, the first snap locking feature 420 is defined by a resilient member. The resilient member may be characterized as a resilient cantilever beam 426 or a resilient fixed beam.

STEP 614, DEFORM A PORTION OF THE FIRST PART TO FABRICATE A PROTRUSION THAT CONTACTS THE SECOND PART AND URGES THE SECOND PART IN A DIRECTION EFFECTIVE TO PLACE THE FIRST AND SECOND MATING SURFACES INTO DIRECT CONTACT WITH ONE ANOTHER, includes deforming a portion of the first part to fabricate a dimple 216 and a corresponding protrusion 242 that contacts the second part and urges the second part in a direction effective to place the first and second mating surfaces 224, 232 into direct contact with one another. The protrusion 242 is characterized as having a generally cylindrical shape. The protrusion 242 is formed by applying ultrasonic vibrational energy to the first part using a generally cylindrical probe 238.

Accordingly a method of closing a spatial gap between a first snap locking feature and a second snap locking feature is provided. This method provides the advantages of reducing relative motion between the parts joined by the first and second snap locking features which may reduce forces experienced by the parts during vibration thus providing a provide a move reliable assembly. The method also produces assemblies having actual vibration performance test results that are closer to expected vibration performance from computer simulation. The method also provides assemblies that are more resistant to inadvertent disassembly since the closing the spatial gap eliminates the over travel needed to disengage the first and second snap locking features. Therefore the first and second snap locking features can be used to permanently connect two parts. Embodiments of the method provide the option of forming the protrusion on the insertion side of the snap locking features, e.g. the third embodiment shown in FIGS. 4A-4E, or opposite the insertion side, e.g. the first embodiment shown in FIGS. 2A-2E.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A method of closing a spatial gap between a first mating surface of a first snap locking feature defined by a first part and a second mating surface of a second snap locking feature defined by a second part, said method comprising the steps of:
    attaching the first and second parts to one another by sliding the first and second snap locking features over one another until the first mating surface is proximate the second mating surface; and
    deforming a portion of the first part to fabricate a protrusion that contacts the second part and urges the second part in a direction effective to place the first and second mating surfaces into direct contact with one another.

2. The method according to claim 1, wherein the protrusion is characterized as having a generally cylindrical shape.

3. The method according to claim 1, wherein the protrusion is formed by applying ultrasonic vibrational energy to the first part using a generally cylindrical probe.

4. The method according to claim 1, wherein the first and second parts are electrical connection components.

5. The method according to claim 4, wherein the first part is a main housing of an electrical center configured to be disposed within a motor vehicle and the second part is a component module housing of the electrical center.

6. The method according to claim 1, wherein the second snap locking feature is defined by a resilient member.

7. The method according to claim 6, wherein the resilient member is characterized as a resilient cantilever beam.

8. The method according to claim 1, wherein the first snap locking feature defines a third mating surface generally parallel to the first mating surface and the second snap locking feature defines a fourth mating surface generally parallel to the second mating surface and wherein the deformed portion of the first part is a portion of the first snap locking feature to urge the second part in the direction effective to place the first and second mating surfaces into direct contact with one another.

9. The method according to claim 8, wherein the first snap locking feature is defined by a resilient member.

10. The method according to claim 9, wherein the resilient member is characterized as a resilient cantilever beam.

11. The method according to claim 9, wherein the resilient member is characterized as a resilient fixed beam.

12. An assembly formed by joining a first part to a second part having a minimized spatial gap between a first mating surface of a first snap locking feature defined by the first part and a second mating surface of a second snap locking feature defined by the second part, said assembly formed by the method comprising the steps of:

attaching the first and second parts to one another by sliding the first and second snap locking features over one another until the first mating surface is proximate the second mating surface; and deforming a portion of the material of the first part to fabricate a protrusion that contacts the second part and urges the second part in a direction effective to place the first and second mating surfaces into direct contact with one another.

13. The assembly according to claim 12, wherein the protrusion is characterized as having a generally cylindrical shape.

14. The assembly according to claim 12, wherein the protrusion is formed by applying ultrasonic vibrational energy to the first part using a generally cylindrical probe.

15. The assembly according to claim 12, wherein the first and second parts are electrical connection components.

16. The assembly according to claim 15, wherein the first part is a main housing of an electrical center configured to be disposed within a motor vehicle and the second part is a component module housing of the electrical center.

17. The assembly according to claim 12, wherein the second snap locking feature is defined by a resilient member.

18. The assembly according to claim 17, wherein the resilient member is characterized as a resilient cantilever beam.

19. The assembly according to claim 12, wherein the first snap locking feature defines a third mating surface generally parallel to the first mating surface and the second snap locking feature defines a fourth mating surface generally parallel to the second mating surface and wherein the deformed portion of the first part is a portion of the first snap locking feature to urge the second part in the direction effective to place the first and second mating surfaces into direct contact with one another.

20. The assembly according to claim 19, wherein the first snap locking feature is defined by a resilient member.

* * * * *